US012109804B2

(12) United States Patent
Mochizuki

(10) Patent No.: US 12,109,804 B2
(45) Date of Patent: Oct. 8, 2024

(54) CUTTING MECHANISM FOR PRINTING APPARATUS

(71) Applicant: CASIO COMPUTER CO., LTD., Tokyo (JP)

(72) Inventor: Yoshiaki Mochizuki, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 18/079,100

(22) Filed: Dec. 12, 2022

(65) Prior Publication Data

US 2023/0191810 A1 Jun. 22, 2023

(30) Foreign Application Priority Data

Dec. 22, 2021 (JP) ................................ 2021-207685

(51) Int. Cl.
*B41J 11/70* (2006.01)
*B41J 11/00* (2006.01)

(52) U.S. Cl.
CPC .......... *B41J 11/703* (2013.01); *B41J 11/0045* (2013.01)

(58) Field of Classification Search
CPC ............................. B41J 11/703; B41J 11/0045
See application file for complete search history.

(56) References Cited

U.S. PATENT DOCUMENTS

| | | | | |
|---|---|---|---|---|
| 2013/0209154 | A1* | 8/2013 | Kasugai | B41J 13/025 400/611 |
| 2015/0015658 | A1* | 1/2015 | Murata | B41J 15/044 347/218 |
| 2015/0084262 | A1* | 3/2015 | Sago | B41J 11/703 270/1.01 |
| 2015/0174926 | A1* | 6/2015 | Kosuge | B41J 11/666 347/104 |
| 2018/0281335 | A1* | 10/2018 | Tanaka | B65H 35/006 |
| 2020/0406641 | A1* | 12/2020 | Kosuge | B41J 11/70 |
| 2021/0016462 | A1* | 1/2021 | Mizutani | B41J 11/663 |
| 2021/0300078 | A1* | 9/2021 | Iwamoto | B41J 11/703 |

FOREIGN PATENT DOCUMENTS

| | | |
|---|---|---|
| JP | 4069037 B2 | 1/2008 |
| JP | 2014136301 A | 7/2014 |

* cited by examiner

*Primary Examiner* — David H Banh
(74) *Attorney, Agent, or Firm* — Holtz, Holtz & Volek PC

(57) ABSTRACT

A cutting mechanism for a printing apparatus, the cutting mechanism includes: a cutter including a cutting blade and a blade receiving member, the cutter being configured to cut at least part of a printing medium with the cutting blade while the blade receiving member is receiving a force from the cutting blade; and a support member provided to suppress deformation of the blade receiving member, wherein the blade receiving member is adjacent to and fixed to the support member.

8 Claims, 6 Drawing Sheets

CUTTING MECHANISM FOR PRINTING APPARATUS

REFERENCE TO RELATED APPLICATIONS

The present application claims priority based on JP 2021-207685 A filed on Dec. 22, 2021, the entire contents of which are incorporated herein.

BACKGROUND

1. Technical Field

The present invention relates to a cutting mechanism for a printing apparatus.

2. Related Art

Printing apparatuses such as label printers that perform printing on a band-shaped tape often include a cutting mechanism for cutting a printed tape. In some cases, a printing apparatus for performing printing on a layered tape having a release-type sheet layer (release sheet layer) on the back of a printing layer includes, as a cutting mechanism, a full cutter that cuts both the printing layer and the release sheet layer and a half cutter that cuts either the printing layer or the release sheet layer.

A full cutter often has a scissor structure for cutting a tape by crossing a pair of opposing blade portions. A half cutter often has a press-cutting structure in which a blade with a stopper is pressed against a blade receiving member and a tape is cut with a predetermined interval secured between the blade receiving member and the blade portion by the stopper.

Such a cutter having a press-cutting structure as the half cutter is known to have a drawback that a bending moment is easily applied due to a strong load applied at the time of cutting. As a countermeasure, JP 2014-136301 A proposes a technique of fixing the cutter unit of the half cutter to the cutter fixing portion near the cutting position where a printing tape is cut.

In JP No. 4069037, the blade receiving member included in the half cutter is fixed to the fixed blade included in the full cutter, and a load applied to the blade receiving member at the time of half-cutting is received by the fixed blade and the fixed blade support portion.

SUMMARY

One aspect of a cutting mechanism of a printing apparatus of the present disclosure includes: a cutter including a cutting blade and a blade receiving member, the cutter being configured to cut at least part of a printing medium with the cutting blade while the blade receiving member is receiving a force from the cutting blade; and a support member provided to suppress deformation of the blade receiving member, wherein the blade receiving member is adjacent to and fixed to the support member.

DETAILED DESCRIPTION

Figure 1:
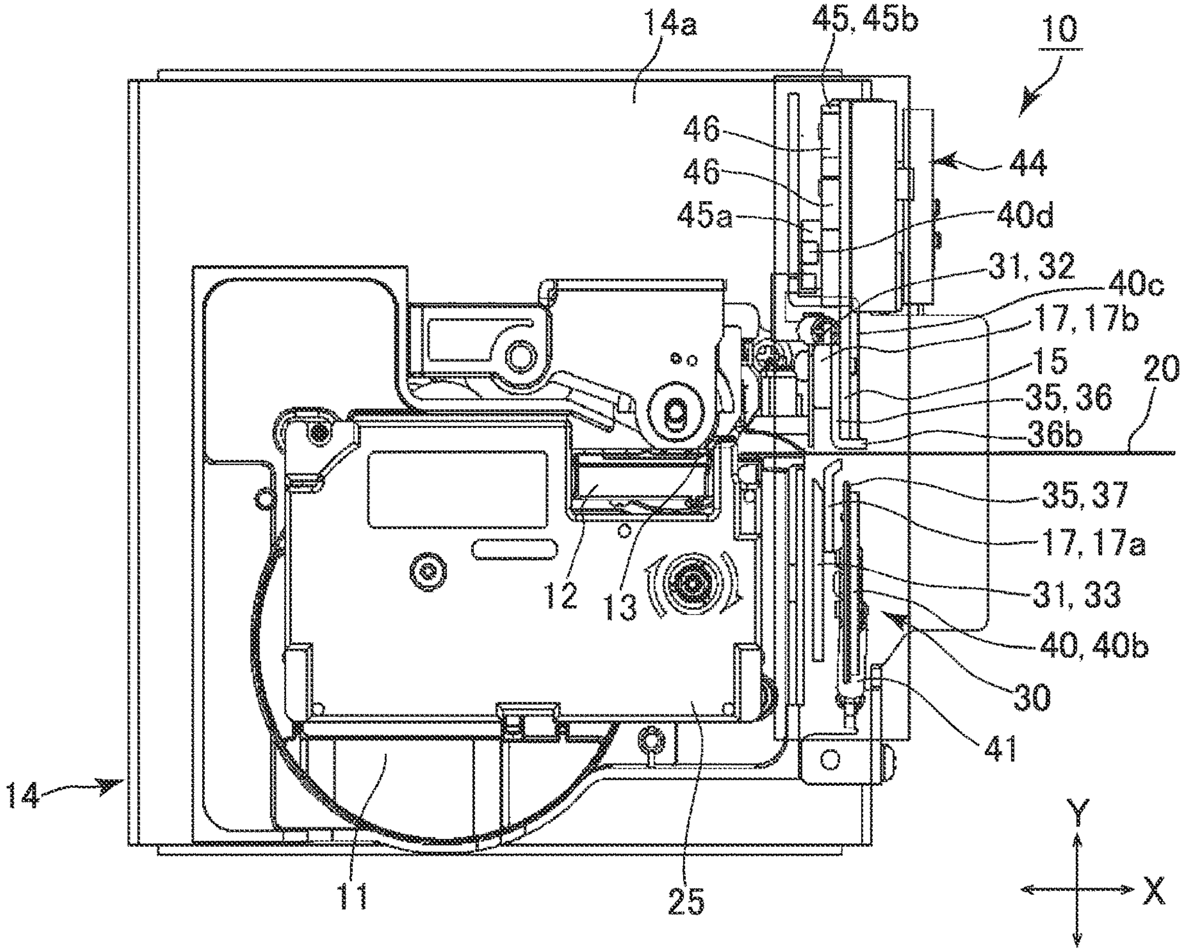
FIG. 1 is a front view illustrating the internal structure of a printing apparatus of the present embodiment.
Figure 2:
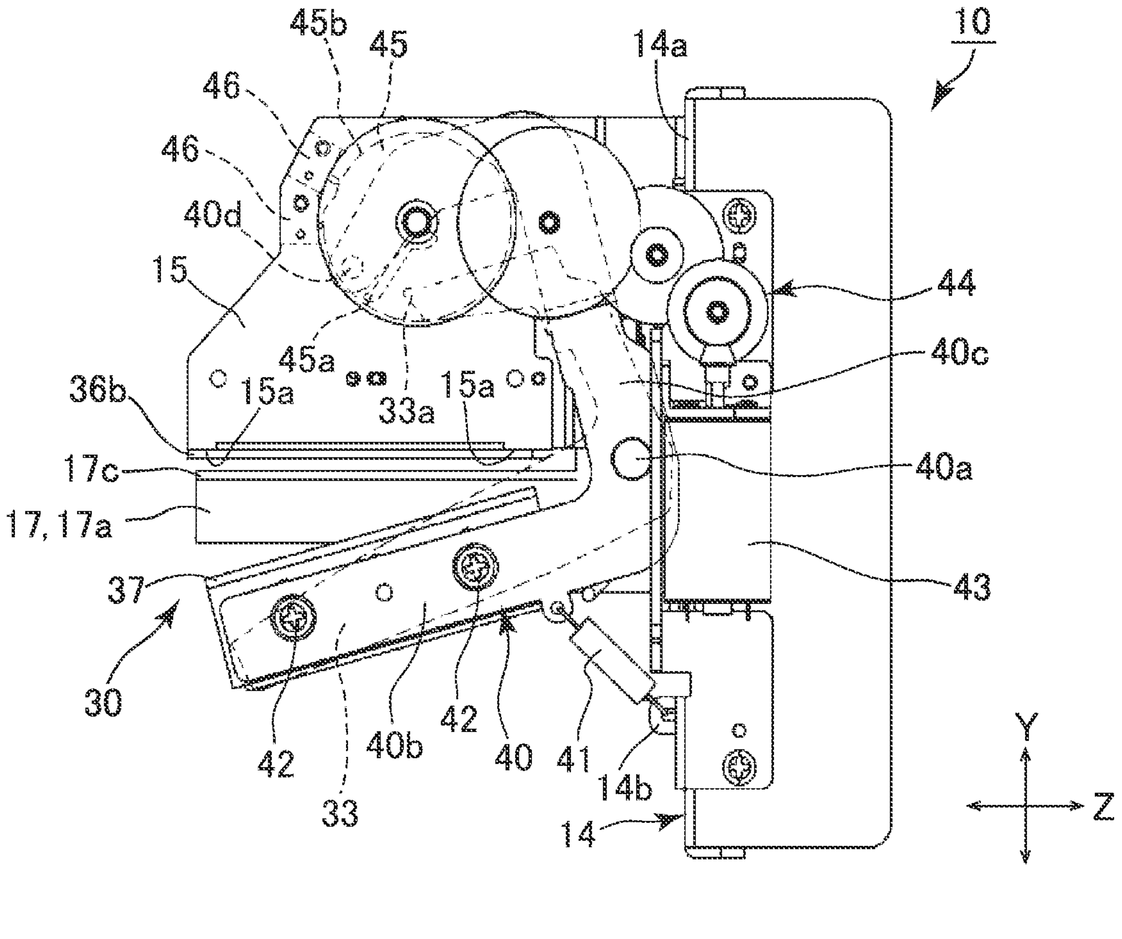
FIG. 2 is a side view illustrating the internal structure of the printing apparatus of the present embodiment.
Figure 3:
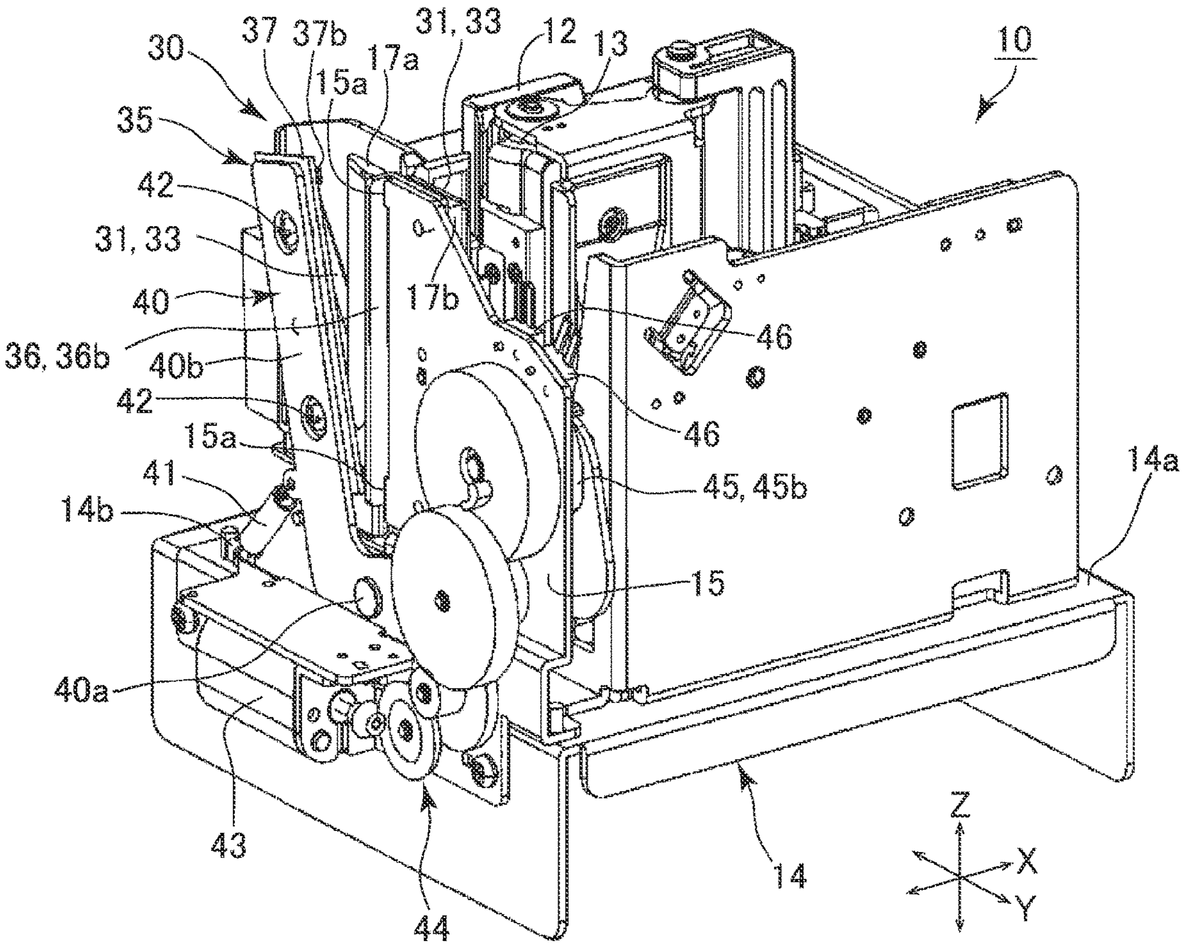
FIG. 3 is a perspective view illustrating the internal structure of the printing apparatus of the present embodiment.

Hereinafter, an embodiment of the present invention will be described in detail with reference to the drawings. FIGS. 1 to 3 illustrate the internal structure of a printing apparatus 10 of the present embodiment. An exterior component is attached to the outside of the internal structure illustrated in FIGS. 1 to 3 to complete the printing apparatus 10. The printing apparatus 10 is a label printer that performs printing on a tape 20 as a band-shaped printing medium to create a label.

The tape 20 is accommodated in a tape cartridge 25. The tape cartridge 25 is attached to a cartridge attachment portion 11 within the printing apparatus 10, and printing is performed on the tape 20 pulled out from the tape cartridge 25.

Printing by the printing apparatus 10 is a thermal transfer type, and ink of an ink ribbon (not illustrated) adheres to the tape 20 by heating. The cartridge attachment portion 11 is provided with a thermal head 12 as a print head that heats the ink ribbon at the time of printing.

Figure 5A:
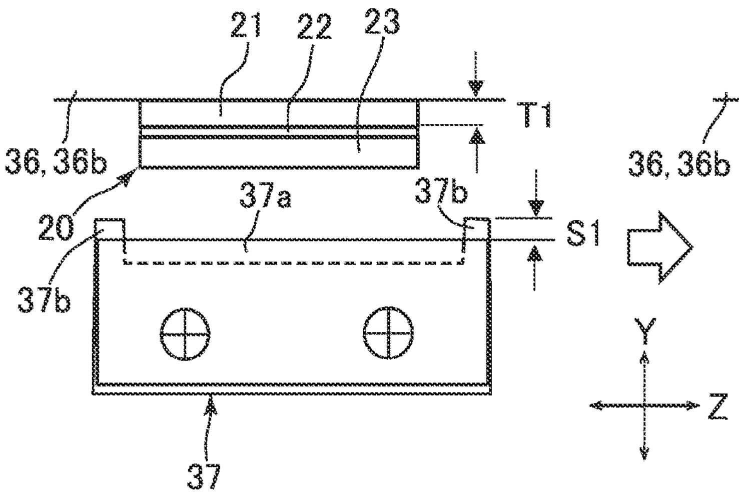
FIGS. 5A and 5B explanatorily illustrate the operation of a half cutter.
Figure 5B:
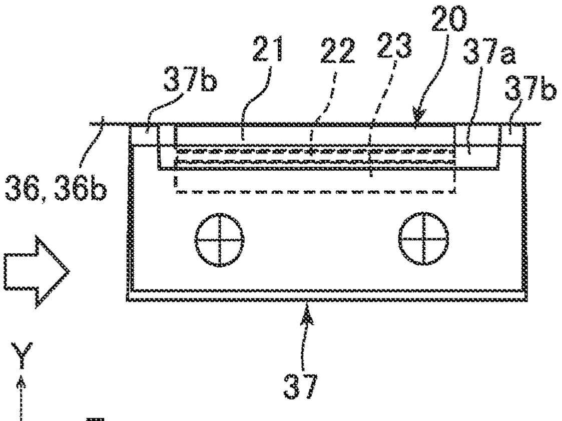

As illustrated in FIGS. 5A and 5B, the tape 20 includes a release sheet layer 21, an adhesive layer 22, and a printing layer 23 that are layered. The ink ribbon accommodated in the tape cartridge 25 is conveyed in an overlapping manner on the printing layer 23 side. At the time of printing, the ink contained in the ink ribbon is melted by heating of the thermal head 12, and then adheres to the printing layer 23.

Note that the printing type of the printing apparatus 10 is not limited to the thermal transfer type. For example, adopted may be thermosensitive printing for developing, by heating of the thermal head 12, a color developer contained in the printing layer 23.

Within the printing apparatus 10, a platen roller 13 faces the thermal head 12. The platen roller 13 is movable to a position separated from the thermal head 12 and a position where the platen roller 13 is in contact with the thermal head 12.

The tape 20 and the ink ribbon pulled out from the tape cartridge 25 pass between the thermal head 12 and the platen roller 13. Due to movement of the platen roller 13 to the position where the platen roller 13 is in contact with the thermal head 12, the tape 20 and the ink ribbon are sandwiched between the thermal head 12 and the platen roller 13. At the time of printing, the thermal head 12 is heated in this sandwiched state. Due to rotation of the platen roller 13 in this sandwiched state, the tape 20 is conveyed in the longitudinal direction. The printed tape 20 is conveyed due to the rotation of the platen roller 13 and discharged outward the printing apparatus 10.

The printing apparatus 10 includes a base chassis 14. The base chassis 14 is included in a main body of the printing apparatus 10, and is formed of a material excellent in strength such as metal. Each component included in the printing apparatus 10 is directly or indirectly attached to the base chassis 14. The base chassis 14 includes a bottom plate 14*a* and a plurality of side walls protruding from the bottom plate 14*a*. The bottom plate 14*a* has a substantially rectangular shape. A direction connecting a pair of sides among four sides of the bottom plate 14*a* is defined as an X-axis direction. A direction connecting the other pair of sides of the bottom plate 14*a* is defined as a Y-axis direction. The X-axis direction and the Y-axis direction are perpendicular to each other. A direction perpendicular to the X-axis direction and the Y-axis direction is defined as a Z-axis direction.

A support wall 15 (support member) is provided along one side extending in the Y-axis direction among the four sides of the bottom plate 14*a*. The support wall 15 is a wall portion protruding from the bottom plate 14*a* in the Z-axis direction, and has a predetermined thickness in the X-axis direction. Note that the support wall 15 has irregularities and steps in the middle and is not completely flat. The support wall 15, however, is a tabular portion substantially extending in the Y-axis direction and the Z-axis direction, and has a pair of side faces facing in the X-axis direction.

Due to the rotation of the platen roller 13, the tape 20 is conveyed substantially in the X-axis direction. That is, the X-axis direction is the conveyance direction of the tape 20. The Y-axis direction is the thickness direction of the tape 20, and the Z-axis direction is the width direction of the tape 20. The support wall 15 is a standing wall provided in a direction intersecting (substantially perpendicular to) the conveyance direction of the tape 20. With the support wall 15 as a boundary, the inner side (left side in FIG. 1) of the printing apparatus 10 is defined as inside in the conveyance direction, and the outer side (right side in FIG. 1) of the printing apparatus 10 is defined as outside in the conveyance direction. The printed tape 20 is discharged outward the printing apparatus 10 across the position where the support wall 15 is provided. The support wall 15 is set to have a shape that does not block a conveyance path for the tape 20. The support wall 15 has an edge 15*a* facing the conveyance path for the tape 20 at an end facing in the Y-axis direction the support wall 15 (see FIG. 4).

One edge of a pair of such edges 15*a* is provided near one end of the support wall 15 and the other edge of the pair of edges 15*a* is provided near the other end of the support wall 15 in the Z-axis direction (see FIGS. 2 and 3). The interval between the pair of edges 15*a* is wider than the tape 20 having the maximum width that is assumed to be used with the printing apparatus 10, and the edges 15*a* are disposed at two places across the passage region for the tape 20 in the Z-axis direction.

Figure 4:
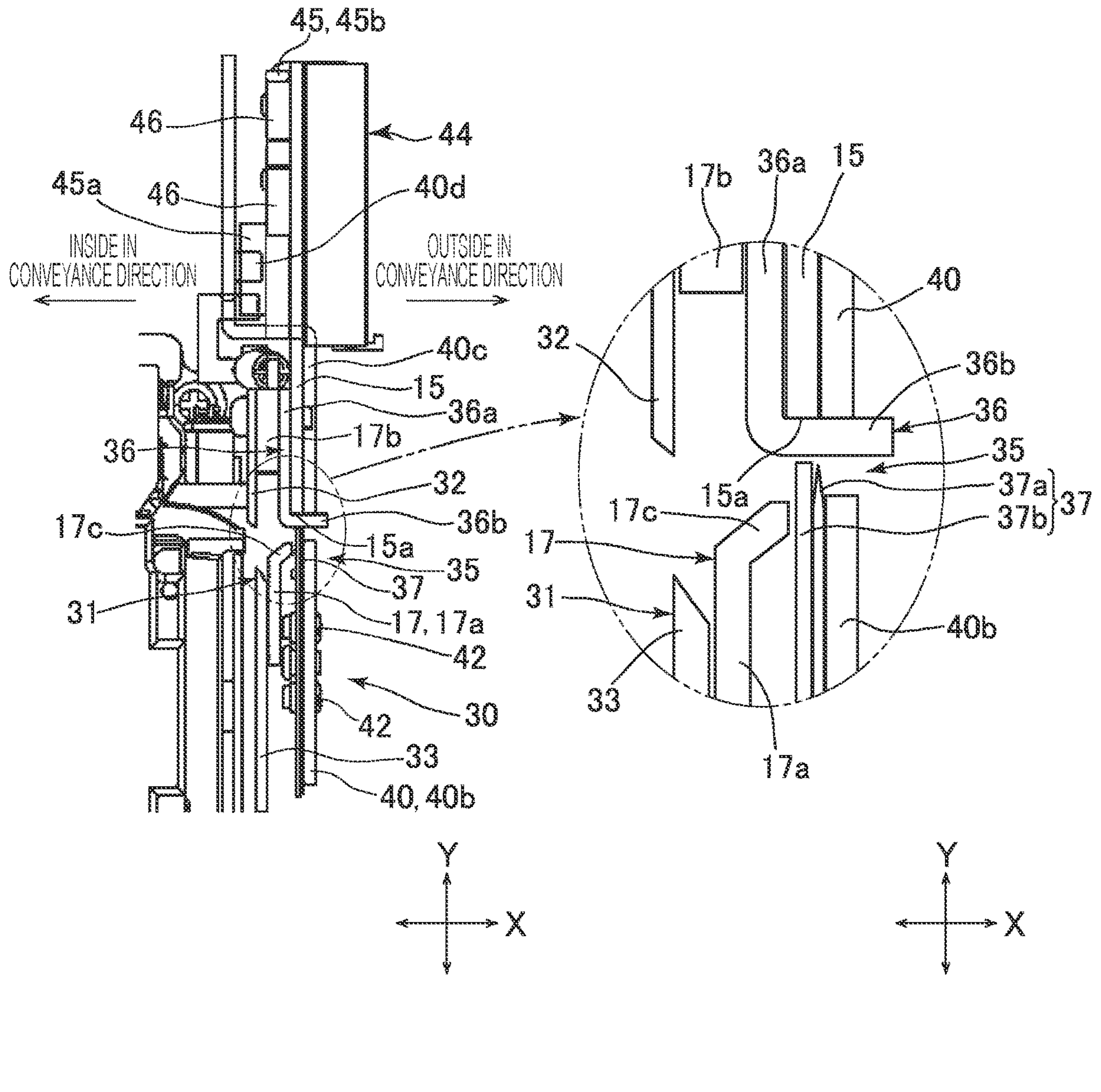
FIG. 4 is an enlarged front view of the vicinity of a cutting mechanism of the printing apparatus of the present embodiment.

A tape guide 17 that guides the tape 20 to set a conveyance path is provided near the support wall 15. The tape guide 17 is disposed inside the support wall 15 in the conveyance direction. As illustrated in FIG. 4, the tape guide 17 has a guide portion 17*a* and a support portion 17*b* disposed separately on one side and the other side of the conveyance path for the tape 20 in the Y-axis direction.

The guide portion 17*a* is provided at a predetermined interval from the edges 15*a* of the support wall 15 in the Y-axis direction, and is slightly inside the support wall 15 in the conveyance direction. The support portion 17*b* is inside the support wall 15 in the conveyance direction. The support portion 17*b* and the inner wall are located side by side. Between the support portion 17*b* and the support wall 15, provided is an interval corresponding to the thickness of a blade receiving member 36 of a half cutter 35 described later.

The printed tape 20 passes between the guide portion 17*a* and the support portion 17*b* and travels outside in the conveyance direction. The guide portion 17*a* has a tip provided with an inclined portion 17*c*. The interval between the support wall 15 and the inclined portion 17*c* in the Y-axis direction reduces from inside to outside in the conveyance direction. The inclined portion 17*c* guides the tape 20 to travel in an appropriate direction.

The printing apparatus 10 includes a cutting mechanism 30 in the middle of the conveyance path for the tape 20. The cutting mechanism 30 cuts the printed tape 20 to complete a label. The cutting of the tape 20 by the cutting mechanism 30 is selectable from full-cutting by a full cutter 31 and half-cutting by the half cutter 35. Hereinafter, the cutting mechanism 30 will be described.

The cutting mechanism 30 includes the full cutter 31 and the half cutter 35 disposed different in position in the conveyance direction. The full cutter 31 is on the upstream side in the conveyance direction (side closer to the thermal head 12 and the platen roller 13), and the half cutter 35 is on the downstream side in the conveyance direction (side far from the thermal head 12 and the platen roller 13).

Each component of the cutting mechanism 30 is supported by the support wall 15, and the support wall 15 serves as a support member that supports the cutting mechanism 30. The full cutter 31 and the half cutter 35 are disposed in tandem in the conveyance direction in the printing apparatus 10. The half cutter 35 is provided at a position adjacent to the support wall 15. The full cutter 31 is provided inside the half cutter 35 in the conveyance direction (at a position far from the support wall 15).

As illustrated in FIG. 4, the full cutter 31 is disposed inside the tape guide 17 in the conveyance direction. The full cutter 31 includes a fixed blade 32 and a movable blade 33. The fixed blade 32 is adjacent to the support portion 17*b* in the X-axis direction. The movable blade 33 is adjacent to the guide portion 17*a* in the X-axis direction. The fixed blade 32 is fixed to support portion 17*b*. The movable blade 33 is supported pivotably about a shaft (not illustrated) along the X-axis direction to the support wall 15. The movable blade 33 is biased by a spring (not illustrated) in a direction in which the movable blade 33 is separated from the fixed blade 32. This separated state is the basic state of the full cutter 31. The movable blade 33 is operated against the biasing force of the spring such that the full cutter 31 full-cuts the tape 20.

The full cutter 31 has a scissor structure for cutting the entirety of the thickness of the tape 20 (the entirety of the tape 20 including the release sheet layer 21 to the printing layer 23). The cutting edge of the fixed blade 32 and the cutting edge of the movable blade 33 cross each other in the Y-axis direction due to close contact of the movable blade 33 to the fixed blade 32, so that the tape 20 is cut between the cutting edge of the fixed blade 32 and the cutting edge of the movable blade 33.

As illustrated in FIG. 4, the half cutter 35 is disposed outside the tape guide 17 in the conveyance direction. The half cutter 35 includes the blade receiving member 36 and a cutting blade 37.

The blade receiving member 36 is a plate-shaped component disposed between the support portion 17*b* of the tape guide 17 and the support wall 15 in the X-axis direction, and is fixed in a state where a side face of the blade receiving member 36 is in close contact with the inner face of the support wall 15. In other words, the blade receiving member 36 is adjacent and fixed to the support wall 15 in the conveyance direction of the tape 20.

The support portion 17*b* of the tape guide 17 is fixed in contact with the side face of the blade receiving member 36 inside in the conveyance direction (side face opposite to the side face fixed to the support wall 15). Further, the fixed blade 32 of the full cutter 31 is fixed in contact with the side face of the support portion 17*b* inside in the conveyance direction (side face opposite to the side face fixed to the blade receiving member 36). That is, the fixed blade 32 of the full cutter 31, the support portion 17*b* of the tape guide 17, the blade receiving member 36 of the half cutter 35, and the support wall 15 in this order are disposed in tandem from inside to outside in the conveyance direction, and these members are fixed to each other.

A method of fixing these members is not limited, but any method can be used. As an example, the blade receiving member 36 is fixed to the support wall 15 by screwing, adhesion, or welding. Further, adopted may be a fastening structure in which the support portion 17*b* of the tape guide 17 and the fixed blade 32 of the full cutter 31 are collectively screwed to the support wall 15 in addition to the blade receiving member 36.

The blade receiving member 36 includes a supported portion 36*a* along the side face of the support wall 15, and the supported portion 36*a* is fixed to the support wall 15. The supported portion 36*a* has a tip in the Y-axis direction. The tip is provided with a bent-shaped receiving portion 36*b* bent to outside in the conveyance direction with respect to the supported portion 36*a*. The receiving portion 36*b* is in contact with the edges 15*a* of the support wall 15 in the Y-axis direction and extends long in the Z-axis direction (see FIG. 2). The receiving portion 36*b* is supported by the pair of edges 15*a* of the support wall 15, and the one edge 15*a* is provided near one end of the support wall 15 and the other edge 15*a* is provided near the other end of the support wall 15 in the Z-axis direction. Such a structure allows the position of the receiving portion 36*b* to be determined with high accuracy.

For example, in the case of the structure in which the receiving portion 36*b* is supported by the entire long end face of the support wall 15 extending in the Z-axis direction instead of such pair of edges 15*a* as in the present embodiment, a shape defect (e.g., unevenness) in part of the end face of the support wall 15 may cause incline of the receiving portion 36*b*. Thus, the accuracy of the entire end face of the support wall 15 requires control. On the other hand, in the case of the configuration of the present embodiment, the pair of edges 15*a* requires high accuracy control and the region between the pair of edges 15*a* has an escape shape (dent shape) not in contact with the receiving portion 36*b*. Thus, the receiving portion 36*b* can be supported with high accuracy with facilitation of the accuracy control of the support wall 15.

As illustrated in FIGS. 4, 5A, and 5B, the cutting blade 37 includes a blade portion 37*a* portion and a stopper 37*b*. The blade portion 37*a* and the stopper 37*b* are superimposed and joined in the X-axis direction. The blade portion 37*a* has a sharp cutting-edge shape for cutting, and the stopper 37*b* has no sharp cutting-edge shape unlike the blade portion 37*a*. As illustrated in FIGS. 5A and 5B, the stopper 37*b* is larger in the amount of protrusion in the Y-axis direction than the blade portion 37*a* near both ends in the Z-axis direction. There is a difference S1 in the amount of protrusion between the blade edge of the blade portion 37*a* and the tip of the stopper 37*b*. The difference S1 is set to a value (S1<T1) smaller than the thickness T1 of the release sheet layer 21 of the tape 20.

As illustrated in FIG. 4, the cutting blade 37 is located on the extension of the support wall 15 in the Y-axis direction, and the tip of the cutting blade 37 faces the receiving portion 36*b* of the blade receiving member 36 in the Y-axis direction. A drive structure described later causes a variation of the distance between the cutting blade 37 and the receiving portion 36*b*. FIG. 5A illustrates a state where the cutting blade 37 is separated from the receiving portion 36*b*. FIG. 5B illustrates a half-cut state where the cutting blade 37 is brought closest to the receiving portion 36*b*.

In the half-cut state, the stopper 37*b* moves toward the edges 15*a* of the support wall 15 such that the tip of the stopper 37*b* abuts on the receiving portion 36*b*, and further approach is restricted. The blade portion 37*a* is cut halfway into the tape 20, and stops in a state of being separated from the receiving portion 36*b* by the difference S1 from the amount of protrusion of the stopper 37*b*. The difference S1 on the cutting blade 37 side and the thickness T1 of the release sheet layer 21 are each set to a value that causes the blade portion 37*a* to bite into the middle of the release sheet layer 21. Therefore, in the half-cut state, the blade portion 37*a* cuts the adhesive layer 22 and the printing layer 23, and the blade portion 37*a* is cut halfway into the release sheet layer 21. A portion of the release sheet layer 21 into which the blade portion 37*a* is not cut is not cut and is continuous in the X-axis direction.

As described above, the half cutter 35 has the press-cutting structure in which the cutting blade 37 with the stopper 37*b* is brought into contact with the blade receiving member 36 and part (the adhesive layer 22 and the printing layer 23) of the thickness of the tape 20 is cut while the blade receiving member 36 is receiving a force from the cutting blade 37.

The cutting blade 37 is attached to the movable member 40. As illustrated in FIGS. 2 and 3, the movable member 40 is a plate-shaped component pivotable about a pivot 40*a* along the X-axis direction, and the pivot 40*a* is connected to and supported by the support wall 15. A region of the movable member 40 near the pivot 40*a* is disposed along the side face of the support wall 15 outside in the conveyance direction. As described above, the blade receiving member 36 of the half cutter 35 is supported on the side face of the support wall 15 inside in the conveyance direction. The blade receiving member 36 is supported on the one side face of the support wall 15, and the movable member 40 is supported on the other side face (side opposite the blade receiving member 36 across the support wall 15) of the support wall 15.

In such a manner, the blade receiving member 36 as the fixing portion of the half cutter 35 and the movable member 40 to which the cutting blade 37 as the movable portion of the half cutter 35 is attached are separately disposed on the one side and the other side of the support wall 15. Thus, the constituent elements of the half cutter 35 can be accommodated in a region close to the support wall 15 with high space efficiency.

As illustrated in FIG. 2, the movable member 40 has a substantially L-shape in side view along the X-axis direction, and the vicinity of an L-shaped bent portion of the movable member 40 is supported through the pivot 40*a*. The substantially L-shaped movable member 40 has a first arm 40*b* to which the cutting blade 37 is attached. The cutting blade 37 is fixed to the first arm 40*b* with a fixing screw 42. As illustrated in FIG. 4, the cutting blade 37 is attached to the face of the first arm 40*b* facing inside in the conveyance direction. Therefore, the first arm 40*b* is located outside the support wall 15 in the conveyance direction, whereas the cutting blade 37 is disposed at the same position as the support wall 15 in the X-axis direction (in a relationship of being disposed in tandem in the Y-axis direction). The distance between the tip of the cutting blade 37 and the receiving portion 36*b* of the blade receiving member 36 is variable by the pivoting (swing) of the movable member 40.

Note that the cutting blade 37 is moved due to the swing of the movable member 40 about the pivot 40*a* and the tip of the cutting blade 37 is substantially parallel to the receiving portion 36*b* (in a direction extending in the Z-axis direction) in a state where the cutting blade 37 abuts on the receiving portion 36*b*. Thus, the press-cutting force applied from the cutting blade 37 to the blade receiving member 36 at the time of half-cutting is mainly a component in the Y-axis direction.

A tension spring 41 connects between the first arm 40*b* of the movable member 40 and a spring hooking portion 14*b* of the base chassis 14. The tension spring 41 applies, to the movable member 40, a biasing force in a direction in which the cutting blade 37 is separated from the blade receiving member 36. FIGS. 2 and 3 illustrate a state where the cutting blade 37 is separated from the blade receiving member 36 by the biasing force of the tension spring 41. This separated state is the basic state of the half cutter 35, and the movable member 40 is operated against the biasing force of the tension spring 41 such that the half cutter 35 half-cuts the tape 20.

The substantially L-shaped movable member 40 has a second arm 40*c* having a crank shape that bends in the X-axis direction in the middle. The vicinity of the tip of the second arm 40*c* is located inside the support wall 15 in the conveyance direction, and has a cam follower 40*d* protruding from the second arm 40*c* (see FIGS. 1 and 2).

As illustrated in FIGS. 2 and 3, a motor 43 is attached outside the support wall 15, and the motor 43 has an output shaft. The rotation of the output shaft of the motor 43 is transmitted while being decelerated by a reduction gear train 44. A cam member 45 that rotates integrally with the final gear of the reduction gear train 44 is provided, and the cam member 45 is provided with a cutter control cam 45*a*. The output shaft of the motor 43 extends in the Y-axis direction. The axis of the rotary shaft of each of the gears included in the reduction gear train 44 and the axis of the rotary shaft of the cam member 45 extend in the Z-axis direction. The direction of rotary transmission is varied through a bevel gear provided on the outer face of the output shaft of the motor 43, and the driving force is transmitted from the motor 43 to the reduction gear train 44.

As illustrated in FIG. 2, the movable blade 33 of the full cutter 31 has a cam follower 33*a* in the vicinity of the cutter control cam 45*a*. The cam follower 40*d* of the movable member 40 is also in the vicinity of the cutter control cam 45*a*. The cam follower 33*a* and the cam follower 40*d* are separately disposed on one side and the other side of the cutter control cam 45*a* in the rotational direction of the cam member 45.

The motor 43 is a direct current (DC) motor, and the rotational direction of the cam member 45 is varied by switching the rotational direction of the output shaft of the motor 43. The driving direction of the motor 43 that rotates the cam member 45 in a first direction (counterclockwise direction in FIG. 2) is defined as forward rotation, and the driving direction of the motor 43 that rotates the cam member 45 in a second direction (clockwise direction in FIG. 2) is defined as reverse rotation.

Due to the rotation of the cam member 45 in the first direction by the forward rotation of the motor 43, the cutter control cam 45*a* presses the cam follower 33*a*. Then, the movable blade 33 is operated in a direction approaching the fixed blade 32 (clockwise direction in FIG. 2) against a force of a spring that biases the movable blade 33, so that the tape 20 is full-cut.

Due to the rotation of the cam member 45 in the second direction by the reverse rotation of the motor 43, the cutter control cam 45*a* presses the cam follower 40*d*. Then, the cutting blade 37 is operated in a direction approaching the blade receiving member 36 (clockwise direction in FIG. 2) against a force of the tension spring 41 that biases the movable member 40, so that the tape 20 is half-cut.

A pair of cam-position detection switches 46 for detecting a rotational position of the cam member 45 is provided around the cam member 45. Each of the pair of cam-position detection switches 46 has a protrusion that comes into contact with a circumferential face cam 45*b* of the cam member 45. The protrusion varies between the protruding state and the retracting state depending on the shape variation of the circumferential face cam 45*b* due to the rotation of the cam member 45.

The initial state in which none of the cutters is operated, the full-cut state in which the full cutter 31 has performed a cutting operation, and the half-cut state in which the half cutter 35 has performed a cutting operation can be detected on the basis of the positional relationship between the protrusions of the pair of cam-position detection switches 46. FIG. 2 illustrates the initial state in which the protrusion of one cam-position detection switch 46 protrudes, and the protrusion of the other cam-position detection switch 46 retracts. In the full-cut state, the respective protrusions of the pair of cam-position detection switches 46 protrude. In the half-cut state, the respective protrusions of the pair of cam-position detection switches 46 retract.

At the time of full-cutting, a control unit of the printing apparatus 10 causes the motor 43 to rotate forward until the full-cut state is detected, and causes the motor 43 to stop when the full-cut state is detected and then subsequently causes the motor 43 to rotate reversely to return to the initial state. At the time of half-cutting, the control unit of the printing apparatus 10 causes the motor 43 to rotate reversely until the half-cut state is detected, and causes the motor 43 to stop when the half-cut state is detected and then subsequently causes the motor 43 to rotate forward to return to the initial state. Torque is generated at the time of stop of the motor 43 due to the detection of the half-cut state. The torque is transmitted to the cutting blade 37 through the reduction gear train 44, the cam member 45, and the movable member 40, and a load is applied from the stopper 37*b* to the blade receiving member 36.

In the cutting mechanism 30 that operates as described above, the full cutter 31 cuts (full-cuts) the tape 20 with the scissor structure in which the respective cutting edges of the fixed blade 32 and the movable blade 33 cross each other, so that a strong force in the Y-axis direction is not applied from the movable blade 33 to the fixed blade 32 at the time of cutting. On the other hand, the half cutter 35 cuts (half-cuts) the tape 20 with the press-cutting structure in which the cutting blade 37 with the stopper 37*b* is brought into contact with the receiving portion 36*b* of the blade receiving member 36, so that a force in the Y-axis direction is input from the cutting blade 37 to the blade receiving member 36 at the time of cutting. The force applied to the blade receiving member 36 at the time of half-cutting varies depending on, for example, the model of the printing apparatus 10, and a load of about 40 kg is applied as an example.

Figures 6A, 6B:
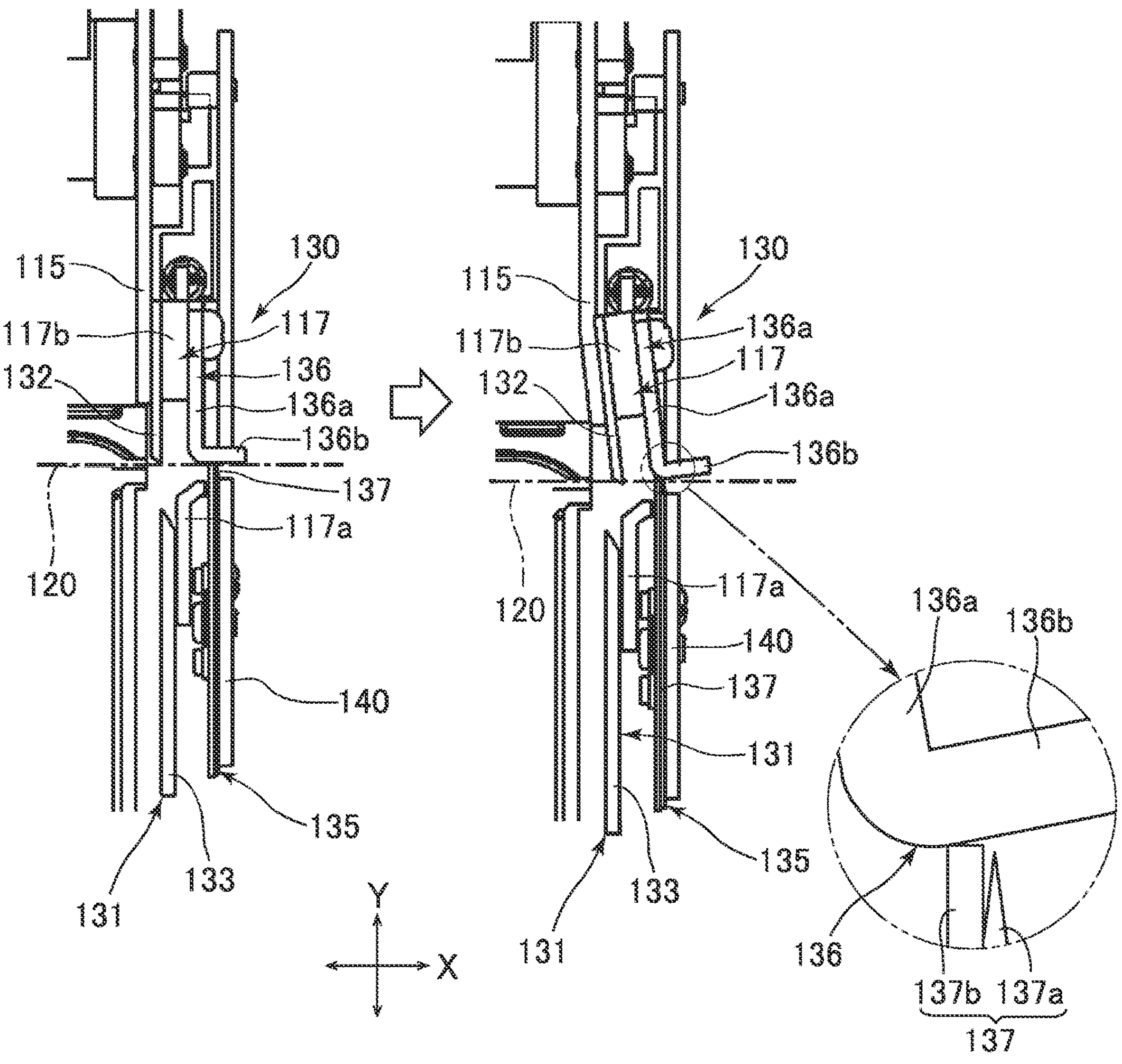
FIGS. 6A and 6B are enlarged front views of the vicinity of a cutting mechanism of a printing apparatus of a comparative example.

In order to describe the effect of the printing apparatus 10 of the present embodiment, a comparative example different in configuration from the present embodiment is illustrated in FIGS. 6A and 6B. A cutting mechanism 130 in the comparative example includes a full cutter 131 and a half cutter 135.

The full cutter 131 includes a fixed blade 132 and a movable blade 133, and cuts the entirety of the thickness of a tape 120 with a scissor structure in which the fixed blade 132 and the movable blade 133 cross each other. The half cutter 135 includes a blade receiving member 136 and a cutting blade 137. The cutting blade 137 includes a blade portion 137*a* and a stopper 137*b*, and is supported by a movable member 140. The half cutter 135 cuts part of the thickness of the tape 120 with a press-cutting structure in which the stopper 137*b* of the cutting blade 137 abuts on the receiving portion 136*b* of the blade receiving member 136.

A tape guide 117 has a guide portion 117*a* and a support portion 117*b* disposed separately on one side and the other side of a conveyance path for the tape 120 in the Y-axis direction.

In the cutting mechanism 130, the full cutter 131 is disposed adjacently outside a support wall 115 as part of a base chassis in the conveyance direction. The tape guide 117 is disposed adjacently outside the full cutter 131 in the conveyance direction. The half cutter 135 is disposed outside the tape guide 117 in the conveyance direction. More specifically, with reference to the support wall 115, the fixed blade 132 of the full cutter 131, the support portion 117*b* of the tape guide 117, and a supported portion 136*a* of the blade receiving member 136 of the half cutter 135 are disposed in tandem in this order to outside in the conveyance direction. The supported portion 136*a* is fixed to the support portion 117*b*. Thus, the distance from the support wall 115 to the blade receiving member 136 in the X-axis direction is increased.

Further, the receiving portion 136*b* of the blade receiving member 136 is bent to outside in the conveyance direction. Thus, the position where the cutting blade 137 abuts on the receiving portion 136*b* is further away from the support wall 115.

FIG. 6A illustrates a case where a load pressing the receiving portion 136*b* of the blade receiving member 136 from the cutting blade 137 in the Y-axis direction acts at the time of half-cutting at the cutting mechanism 130 having such a structure. Here, the receiving portion 136*b* as an input portion of the load and the support wall 115 that finally receives the load are greatly displaced in the X-axis direction. Thus, a large bending moment to incline in the Y-axis direction is generated when the load applied to the blade receiving member 136 is large.

The support wall 115 has high strength against a load (compressive load) linearly input in the Y-axis direction. However, the thickness of the support wall 115 in the X-axis direction is limited, and the support wall 115 has a cantilever structure at a portion where the fixed blade 132 and the blade receiving member 136 are supported. Thus, the support wall 115 is likely to be deformed in the X-axis direction. Here, when such a bending moment as described above is generated due to input of a large load from the cutting blade 137 to the blade receiving member 136, as illustrated in FIG. 6B, the support wall 115 may be deformed to be bent in the X-axis direction.

When the support wall 115 is bent, the fixed blade 132 and the blade receiving member 136 supported by the support wall 115 are inclined along with the support wall 115. Then, the position of the receiving portion 136*b* with respect to the cutting blade 137 deviates from the design position, so that an excess or deficiency occurs in the amount of cutting at the time of half-cutting. In the example of FIG. 6B, the distance between the receiving portion 136*b* and the blade portion 137*a* is increased due to the inclination of the blade receiving member 136, and the amount of cutting by the blade portion 137*a* is insufficient.

Further, in a case where the deformation of the support wall 115 illustrated in FIG. 6B is not elastic deformation but plastic deformation and the deformation of the support wall 115 is maintained even after a half-cutting operation, the positional deviation of the blade receiving member 136 continues even in the next and subsequent cutting operations.

Furthermore, if the deformation of the support wall 115 is maintained, the position of the fixed blade 132 of the full cutter 131 also remains deviated. Thus, there is a possibility that an appropriate full-cut operation cannot be executed. For example, in the state of FIG. 6B, the fixed blade 132 is on the movement route of the movable blade 133, and the movable blade 133 collides with the fixed blade 132 without crossing each other. In a case where the support wall 115 is bent in a direction opposite to the direction illustrated in FIG. 6B, the distance between the fixed blade 132 and the movable blade 133 is increased excessively, and there is a possibility that the tape 120 is not be cut.

Unlike the comparative example of FIGS. 6A and 6B, in the case of the printing apparatus 10 of the present embodiment, the support wall 15 and the blade receiving member 36 are adjacent to each other in the conveyance direction (X-axis direction) without sandwiching a different member therebetween. The distance between the blade receiving member 36 and the support wall 15 in the X-axis direction is shorter. As a result, when the blade receiving member 36 receives a load in the Y-axis direction from the cutting blade 37, a moment that tends to incline in the input direction of the load hardly acts.

Further, the blade receiving member 36 includes the receiving portion 36*b* having a shape bent to outside in the conveyance direction (toward the support wall 15), and the receiving portion 36*b* is at a position where the receiving portion 36*b* is in contact with the edges 15*a* of the support wall 15. Thus, the cutting blade 37, the receiving portion 36*b*, and the support wall 15 are in a positional relationship of being disposed in tandem in the Y-axis direction. At the time of half-cutting, a load from the cutting blade 37 is linearly input to the support wall 15 through the receiving portion 36*b*. The support wall 15 has high strength against a load (compressive load) linearly input in the Y-axis direction, and receiving the load at the edges 15*a* is very advantageous in strength. Further, due to the direct reception of a force from the receiving portion 36*b* at the edges 15*a*, a shear load is less likely to occur between the supported portion 36*a* of the blade receiving member 36 and the support wall 15.

For the above reason, even if a strong force is applied from the cutting blade 37 to the blade receiving member 36 at the time of half-cutting, the blade receiving member 36 and the support wall 15 are hardly deformed, and the cutting mechanism 30 is excellent in reliability and durability of the operation of the half cutter 35.

Due to the devised disposition of the components included in the full cutter 31 and the half cutter 35, the effect of improving the load resistance is obtained, and no significant increase in size or weight for enhancing the rigidity is required for the individual components. For example, the support wall 15 is set to have a thickness almost the same as that of the other wall portions included in the base chassis 14, and countermeasures for increasing the thickness of the support wall 15 are not taken. However, the required strength as the support portion of the cutting mechanism 30 can be satisfied sufficiently. Therefore, the printing apparatus 10 including the cutting mechanism 30 can be configured to be small and light, resulting in suppression of the manufacturing cost.

In order to perform reliable half-cutting with the half cutter 35, it needs precise management of the interval between the receiving portion 36*b* of the blade receiving member 36 and the blade portion 37*a* of the cutting blade 37. Here, because the inclination of the blade receiving member 36 is suppressed, the interval between the receiving portion 36*b* and the blade portion 37*a* does not vary, which facilitates the positional management of the blade portion 37*a* of the cutting blade 37. Specifically, it is sufficient to appropriately manage the difference S1 (FIGS. 5A and 5B) in the amount of protrusion between the blade portion 37*a* and the stopper 37*b*, and the requirement of dimensional tolerance regarding the amount of protrusion of the stopper 37*b* can be alleviated (it does not need to consider the case where the blade receiving member 36 is inclined). As a result, the manufacturing cost of the cutting mechanism 30 can be reduced.

In the case of the full cutter 31, the half cutter 35 and the tape guide 17 are disposed between the full cutter 31 and the support wall 15. The distance in the X-axis direction to the support wall 15 is larger than that of the half cutter 35. However, the movable blade 33 is not pressed against the fixed blade 32 at the time of full-cutting. In the case of the full cutter 31, a large force is less likely to act on the supporting portions of the movable blade 33 and fixed blade 32 in comparison with the half cutter 35. Therefore, even if the full cutter 31 is disposed as in the cutting mechanism 30 of the present embodiment, a large moment that deforms the support wall 15 at the time of full-cutting does not act.

As described above, the cutting mechanism 30 of the printing apparatus 10 of the present embodiment is achieved by focusing on the difference in the structural and operative conditions of the full cutter 31 and the half cutter 35 and determining how to disposed the full cutter 31 and the half cutter 35 with respect to the support wall 15 to be advantageous in the load bearing property.

Further, the blade receiving member 36 included in the half cutter 35 is provided with the receiving portion 36*b* located on the extension of the support wall 15 in the Y-axis direction, and the receiving portion 36*b* and the support wall 15 are located in the direction in which the force received from the cutting blade 37 acts. With this arrangement, it is further less likely to occur the bending moment for inclining the support wall 15.

Furthermore, the edges 15*a* of the support wall 15 abut on the receiving portion 36*b* at the two places across the passage region for the tape 20 in the Z-axis direction (width direction of the tape 20). This arrangement facilitates the management of the positional accuracy of the receiving portion 36*b*, resulting in determination of the position of the receiving portion 36*b* with high accuracy.

Still furthermore, the blade receiving member 36 (supported portion 36*a*) of the half cutter 35 and the movable member 40 that supports the cutting blade 37 are separately disposed on the one side and the other side of the support wall 15. This arrangement improves the space efficiency for disposing the components of the half cutter 35, and improves the sectional rigidity due to the stacking relationship between the blade receiving member 36, the support wall 15, and the movable member 40. As a result, the strength near the half cutter 35 is further improved.

The above embodiment has been given as a specific example to facilitate understanding of the invention. The present invention is not limited to the embodiment, and thus various modifications and alternations can be made without departing from the gist of the invention.

As a modification, the full cutter 31 and the half cutter 35 may be adjacent to each other and disposed in the X-axis direction without disposing the tape guide 17 between the full cutter 31 and the half cutter 35. However, such adjacent disposition of the full cutter 31 and the half cutter 35 may cause interference in operation of the movable blade 33 of the full cutter 31 or the cutting blade 37 of the half cutter 35. Thus, it is desirable to secure a predetermined clearance between the full cutter 31 and the half cutter 35 in consideration of absorption of an accuracy error.

The tape guide 17 of the present embodiment has a function as a spacer for securing a clearance between the full cutter 31 and the half cutter 35 in addition to a function of guiding the tape 20 with the guide portion 17*a* and a function of supporting the fixed blade 32 with the support portion 17*b*. It is greatly advantageous to dispose the tape guide 17 between the full cutter 31 and the half cutter 35 in such a manner Thus, the printing apparatus 10 of the present embodiment adopts this configuration.

As another modification, the half cutter 35 may follow the configuration of the present embodiment and the full cutter 31 may be disposed outside the support wall 15 in the conveyance direction. That is, the positional relationship between the full cutter 31 and the half cutter 35 in the X-axis direction is reversed, and the half cutter 35 is disposed on one side and the full cutter 31 is disposed on the other side so as to sandwich the support wall 15. A cutting apparatus, however, is often designed with the position of its full cutter as a reference. If the full cutter 31 is disposed outside the support wall 15 in the conveyance direction, the distance from the thermal head 12 to the full cutter 31 is longer. As a result, the utilization efficiency of the tape 20 may decrease (region not used for printing may increase).

From such a viewpoint, the printing apparatus 10 of the present embodiment adopts the configuration in which the full cutter 31 and the half cutter 35 are disposed in order from the upstream side in the conveyance direction. This arrangement enhances the utilization efficiency of the tape 20. Further, the full cutter 31 is not disposed outside the support wall 15 in the conveyance direction, resulting in prevention of an increase in size of the printing apparatus 10, particularly, an increase in length of the conveyance path in the X-axis direction.

The printing apparatus 10 of the present embodiment includes, as the half cutter 35, the cutter having the cutting blade 37 and the blade receiving member 36. The cutter having the press-cutting structure with such a cutting blade 37 and a blade receiving member 36 is not limited to a half cutter. For example, a cutter having a press-cutting structure (i.e., cutter having a cutting blade and a blade receiving member) to which the present invention is applied may be a full cutter that cuts the entirety of the thickness of a tape. The disadvantage that a bending moment is likely to be applied due to a strong load applied at the time of cutting is derived from such a press-cutting structure, and thus the technical idea of the present invention is useful for all cutters having the press-cutting structure.

What is claimed is:

1. A cutting mechanism for a printing apparatus, the printing apparatus comprising a base chassis to which each component of the printing apparatus is attached, and the cutting mechanism comprising:

a cutter including a cutting blade and a blade receiving member, the cutter being configured to cut at least part of a printing medium with the cutting blade while the blade receiving member is receiving a force from the cutting blade; and a support member provided to suppress deformation of the blade receiving member, the support member comprising a portion of the case chassis of the printing apparatus, wherein the blade receiving member is adjacent to and fixed to the support member on an inner side of the support member.

2. The cutting mechanism according to claim 1, further comprising a full cutter configured to cut an entirety of a thickness of the printing medium, wherein:

the cutting blade and the blade receiving member serve as a half cutter configured to cut part of the thickness of the printing medium, the cutting blade being provided with a stopper configured to abut on the blade receiving member such that the part of the thickness of the printing medium is cut, and the support member serves as a support wall provided in a direction intersecting a conveyance direction of the printing medium.

3. The cutting mechanism according to claim 1, wherein:

the blade receiving member includes a supported portion along a side face of the support member and a receiving portion bent with respect to the supported portion and located along an edge of the support member, the edge facing a conveyance path for the printing medium, and the cutting blade moves toward the edge of the support member to abut on the receiving portion.

4. The cutting mechanism according to claim 3, wherein, in order for the cutter to cut the part of the printing medium, the edge of the support member abuts on the receiving portion at two places across a passage region for the printing medium in a width direction of the printing medium.

5. The cutting mechanism according to claim 1, further comprising a movable member pivotably supported by the support member, the movable member being located opposite the blade receiving member across the support member in a conveyance direction of the printing medium, wherein the cutting blade is supported by the movable member.

6. The cutting mechanism according to claim 2, wherein:

the full cutter includes a fixed blade and a movable blade, and the fixed blade of the full cutter, a tape guide configured to guide conveyance of a tape as the printing medium, the blade receiving member of the half cutter, and the support wall are disposed in order in tandem in the conveyance direction of the printing medium.

7. The cutting mechanism according to claim 3, wherein the supported portion extends along a plane that is perpendicular to a conveyance direction of the printing medium.

8. The cutting mechanism according to claim 7, wherein the supported portion is provided opposite to and extending in parallel with the support member and is fixed to an inner side face of the support member.

* * * * *